US009429452B2

(12) United States Patent
Amiri et al.

(10) Patent No.: US 9,429,452 B2
(45) Date of Patent: Aug. 30, 2016

(54) METHOD AND APPARATUS FOR CONTINUOUS ONLINE MONITORING OF A PULSATING PUMP

(71) Applicant: Wave Control Systems Ltd., Edmonton (CA)

(72) Inventors: Mohammad Saeid Amiri, Edmonton (CA); Trevor Gordon Brown, Edmonton (CA)

(73) Assignee: WAVE CONTROL SYSTEMS LTD., Edmonton (CA)

( * ) Notice: Subject to any disclaimer, the term of this patent is extended or adjusted under 35 U.S.C. 154(b) by 356 days.

(21) Appl. No.: 13/768,621

(22) Filed: Feb. 15, 2013

(65) Prior Publication Data

US 2013/0211744 A1   Aug. 15, 2013

(51) Int. Cl.
| | | |
|---|---|---|
| *G01F 1/00* | (2006.01) | |
| *G01F 1/34* | (2006.01) | |
| *F04B 49/06* | (2006.01) | |
| *G01M 3/26* | (2006.01) | |
| *F02M 65/00* | (2006.01) | |
| *F04B 49/00* | (2006.01) | |

(52) U.S. Cl.
CPC .............. *G01F 1/34* (2013.01); *F04B 49/065* (2013.01); *G01M 3/26* (2013.01); *F02M 65/006* (2013.01); *F04B 49/00* (2013.01)

(58) Field of Classification Search
USPC ........................................................ 702/47
See application file for complete search history.

(56) References Cited

U.S. PATENT DOCUMENTS

| | | | |
|---|---|---|---|
| 4,004,607 A * | 1/1977 | Freese ........................... | 137/486 |
| 4,549,853 A | 10/1985 | Gasper et al. | |
| 5,038,893 A | 8/1991 | Willner et al. | |
| 5,237,310 A | 8/1993 | Smith | |
| 5,315,294 A | 5/1994 | Toth | |
| 8,226,370 B2 * | 7/2012 | Wu et al. .......................... | 417/12 |
| 2009/0252620 A1 | 10/2009 | Lazzara | |

OTHER PUBLICATIONS

Canadian Examination Report mailed Jan. 26, 2015, issued in corresponding Canadian Patent Application No. 2,768,019 filed Feb. 15, 2012, 4 pages.

* cited by examiner

*Primary Examiner* — Paul D Lee
(74) *Attorney, Agent, or Firm* — Davis & Bujold PLLC; Michael J. Bujold

(57) ABSTRACT

There is described a method for continuous online monitoring of a pulsating pump. A first step involves monitoring discharge pressure patterns caused by each stroke of the pulsating pump. A second step involves using a computer processing unit to analyze each pressure spike in the discharge pressure patterns and arrive at derived calculations for stroke length, stroke frequency and flow rate. A width of the base of the pressure spike is indicative of pump stroke frequency and an area of the pressure spike being indicative of fluid pumped per stroke. The pump's stroke length and the pump flow rate is fluid pumped per stroke multiplied by stroke frequency.

15 Claims, 3 Drawing Sheets

METHOD AND APPARATUS FOR CONTINUOUS ONLINE MONITORING OF A PULSATING PUMP

FIELD

There is described a method and associated apparatus for continuous online monitoring of a pulsating pump. This is of significant value for applications such as automated process control, remote pump stations, and pump protection switches.

BACKGROUND

Positive Displacement pumps are widely used in various applications including but not limited to chemical injection and metering systems, where a chemical additive is injected from a storage reservoir into a process. The chemical additive can have a significant role in the process, such that continuously verifying the injection rate and proper operation of the pump is necessary. It is difficult if not impossible to verify if the pump is injecting proper amounts of the chemical by visual inspection only. Conventionally operators verify pump flow-rates by isolating the chemical supply and pumping from a draw down column on the suction side. Some of the malfunctions that affect a pump's flow-rate include, but are not limited to, loss of chemical supply, check-valve malfunction, line blockage, leakages in the diaphragm or in the lines, and loss of actuation.

There are some patents that directly or indirectly endeavour to address this problem: U.S. Pat. No. 4,549,853 (Gasper et al) Positive Displacement Pump Output Monitor; U.S. Pat. No. 5,038,893 (Willner et al) Lubrication Monitoring System; U.S. Pat. No. 5,237,310 (Smith) Pump Monitor; and U.S. Pat. No. 5,315,294 (Toth) Fluid Metering Verification System.

SUMMARY

According to one aspect, there is provided a method for continuous online monitoring of a pulsating pump. A first step involves monitoring discharge pressure patterns caused by each stroke of the pulsating pump. A second step involves using a computer processing unit to analyse each pressure spike in the discharge pressure patterns and arrive at derived calculations for stroke length, stroke frequency and flow rate. A width of the base of the pressure spike is indicative of pump stroke frequency and an area of the pressure spike being indicative of fluid pumped per stroke. The pump's stroke length and the pump flow rate is fluid pumped per stroke multiplied by stroke frequency.

As will hereinafter be further described by comparison with the Willner et al reference, the above described method goes beyond the teachings of the prior art and provides resulting advantages based upon an ability to isolate and distinguish changes in stroke length, stroke frequency, flow per stroke, and flow rate.

Once the basic method is understood, there are additional features that can be added to further enhance performance. The method can be enhanced to having the processing unit compare the derived calculations to set values either calibrated or self-learned which is stored in memory. The enables the processing unit to implement a pump control strategy based upon a set of rules and a comparison of the set values with the derived calculations.

As with the prior art, the processing unit triggers an alarm when the derived calculations differ from the set values. However, unlike the prior art, the processing unit can have stored in memory a look up table of acceptable set values indicative of intentional operator implemented changes, for which an alarm need not be triggered notwithstanding that the derived calculations differ from the set values. This enables the method of avoid false alarm conditions which are prevalent in the prior art. It is also possible for the processing unit to have stored in memory a diagnostic look up table and trigger a "pre-emptive service call required" alarm based upon a prediction of possible failure in future due to differences noted between the derived calculation and the set value. This enables service calls to be scheduled in a proactive manner to avoid a loss of production, rather than in a reactive matter as a result of a failure occurring.

Although beneficial results may be obtained through the use of the method, as described above, even more beneficial results may be obtained when a flow restricting apparatus is positioned upstream of the pressure sensor. The flow restricting apparatus will tend to exaggerate discharge pressure patterns, thereby providing increased sensitivity and accuracy to pressure sensor measurement.

According to another aspect of the present invention there is provided an apparatus for continuous online monitoring of a pulsating pump. The apparatus includes a pressure sensor for monitoring discharge pressure patterns caused by each stroke of the pulsating pump. A computer processing unit is provided for analysing each pressure spike in the discharge pressure patterns to arrive at derived calculations for stroke length, stroke frequency, flow per stroke, and flow rate, in accordance with the teachings of the method described above.

As described above, improved performance may be obtained by combining the apparatus with a flow restricting apparatus upstream of the pressure sensor. One suitable form of flow restricting apparatus is an orifice plate.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

A method for continuous online monitoring of a pulsating pump will now be described with reference to FIG. 1 through 6.

Figure 1:
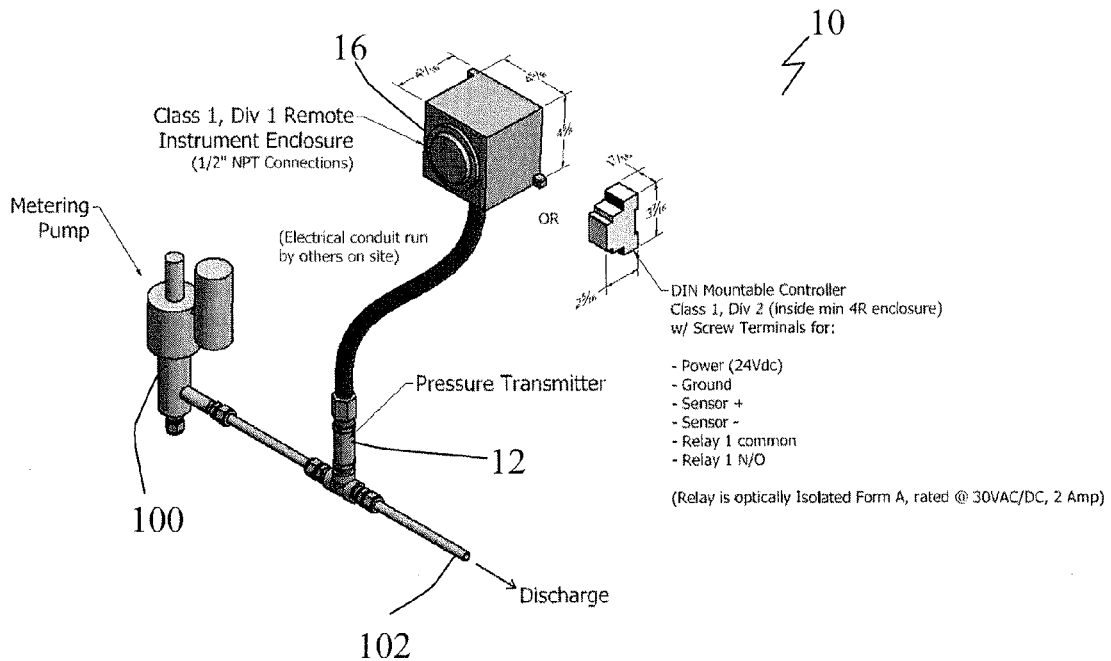
FIG. 1 is a perspective view of an apparatus for continuous online monitoring of a pulsating pump.
Figure 3:
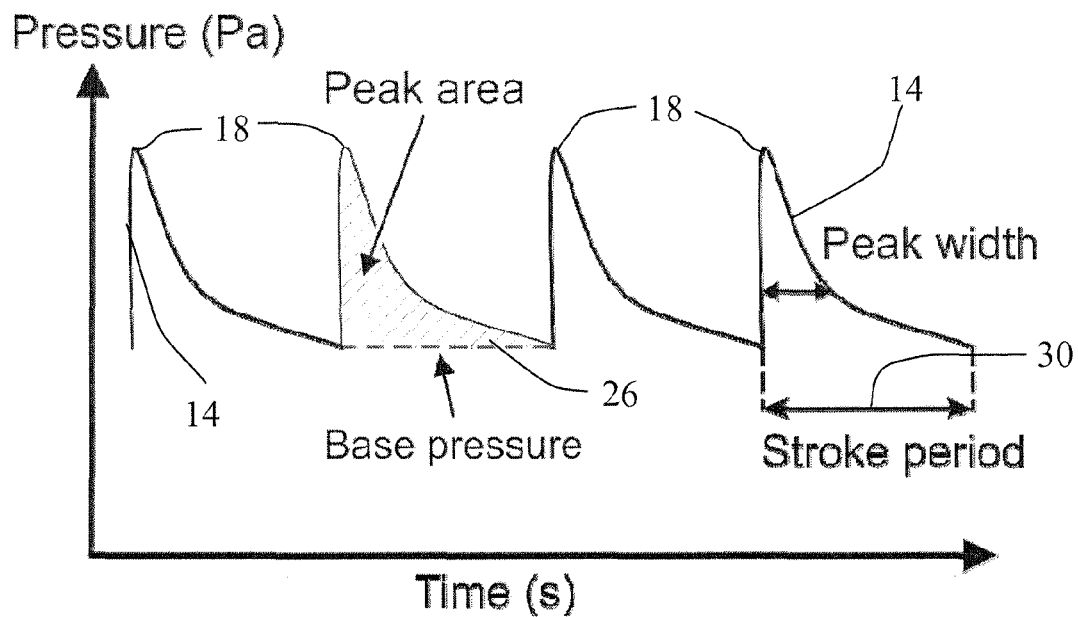
FIG. 3 is a schematic diagram of a discharge pressure pattern from a pulsating pump.
Figure 4:
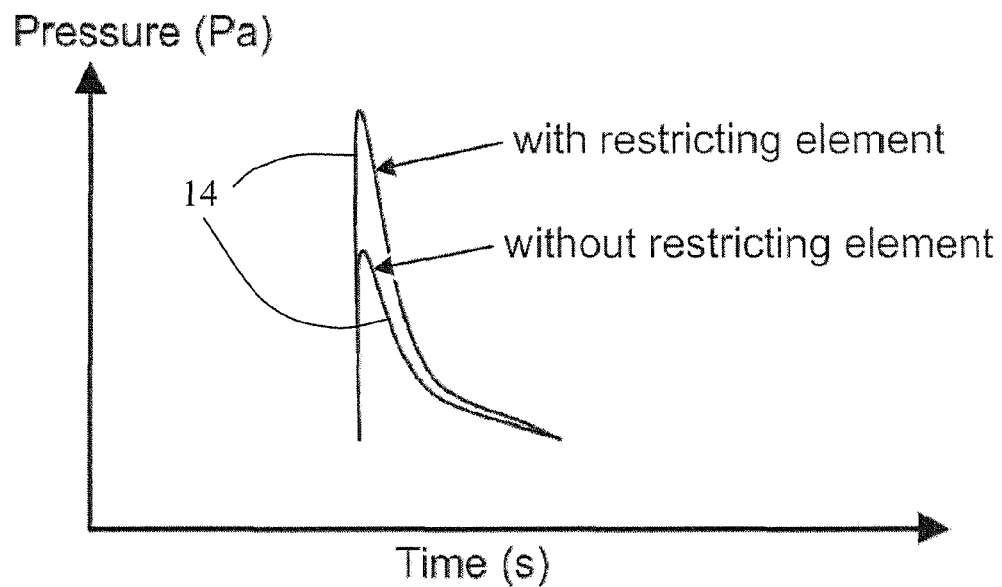
FIG. 4 is a schematic diagram of an individual pressure spike from the discharge pressure pattern illustrated in FIG. 3.

Structure and Relationship of Parts:

Referring to FIG. 1, there is illustrated an apparatus 10 developed for implementing the method. Pulsating pump 100 is illustrated which discharges into a discharge line 102. Apparatus 10 includes a pressure sensor 12 for monitoring discharge pressure patterns caused by each stroke of pulsating pump 100. Referring to FIG. 4, the discharge pressure patterns are illustrated and generally indicated by reference numeral 14. Referring to FIG. 1, a computer processing unit 16 is provided. Referring to FIG. 3, processing unit 16 (not shown in this Figure) analyses each pressure spike 18 in discharge pressure patterns 14 to arrive at derived calculations for stroke length, stroke frequency, flow per stroke, and flow rate, in accordance with the teachings of the method described below.

Figure 2:
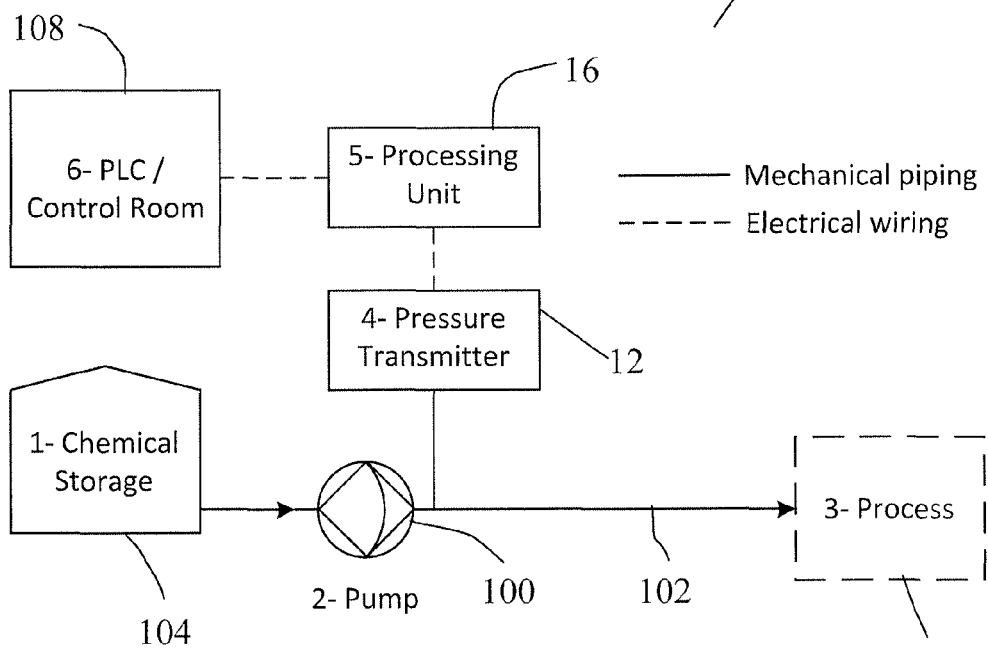
FIG. 2 is a schematic block diagram of a method for continuous online monitoring of a pulsating pump using the apparatus illustrated in FIG. 1.
Figure 6:
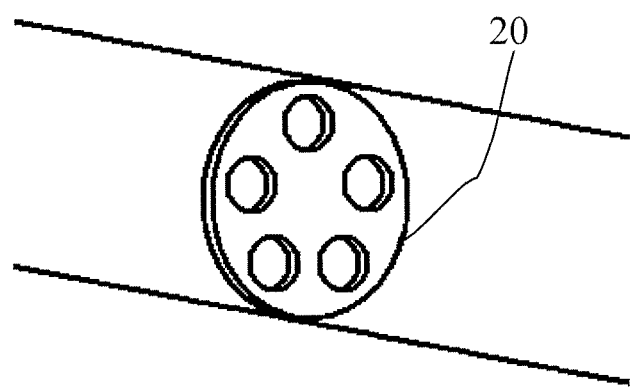
FIG. 6 is a perspective view of an orifice plate positioned within a flow line downstream of the pulsating pump.

Referring to FIG. 2, there is illustrated a typical installation in which pulsating pump 100 is used for chemical injection. In this installation, a chemical storage reservoir 104 supplies chemical to pump 100, which pumps the chemical through discharge line 102 to be used in a process, generally indicated by reference numeral 106. Pressure sensor 12 is positioned downstream of pump 100. Pressure sensor 12 provides data on discharge pressure patterns to processing unit 16, which analyses the data, as will hereinafter be further described. Processing unit 16, in turn, may report to a control room, generally indicated by reference numeral 108. It is preferred that a flow restricting apparatus be positioned downstream of pump 100 and upstream of pressure sensor 12. Referring to FIG. 6, an orifice plate 20 has been illustrated as a suitable form of flow restricting apparatus.

Operation:

Referring to FIG. 2, pump status is monitored in control room 108. A normally-open dry-contact relay and an LED are used for remote/local annunciation of pump status, as viewed in control room 108. Referring to FIG. 1 and FIG. 2, pump 100 (which may be a reciprocating plunger, piston, or diaphragm pump) periodically pulls fluid chemicals from chemical storage reservoir 104 through its suction port and pushes it out through its discharge port, sending it along discharge line 102. As a result, pressure spikes with a relatively consistent pattern—patterns correlated with flow-rate—are generated at the pump's discharge. Referring to FIG. 3, apparatus 10 verifies the pump flow-rate by continuously analysing and interpreting discharge pressure patterns 14 surrounding pressure spikes 18 downstream the pump. Based upon this analysis, apparatus 10 can also calculate other useful operating parameters such as stroke-rate, stroke-length, flow per stroke, flow rate, and the discharge pressure of the pulsating pump FIG. 3, a width 30 of base 26 of pressure spike 18 is indicative of pump stroke frequency. An area of pressure spike 18 is indicative of pump flow per stroke or equivalently pump stoke length.

The accuracy and sensitivity of the analysis can be enhanced by installing a flow-restricting element downstream pump 100. Referring to FIG. 6, the flow-restricting element used is an orifice plate 20, which serves to exaggerate and intensifying the pressure spikes so that they can be sensed by apparatus 10.

Referring to FIG. 1 and FIG. 2, a typical implementation of this method, will have apparatus 10 consisting of two components; pressure sensor 12 installed downstream pump, and computer processing unit 16. Processing unit 16 continuously analyses and interprets signals from pressure sensor 12, by carrying out computational algorithms to provide a real-time status-check on the pump, as described above. No moving parts are involved; hence implementations rugged for difficult pressure/temperature/chemistry conditions can be conveniently developed. It will be apparent that pressure sensor 12 and processing unit 16 could be combined into one single device.

Figure 5:
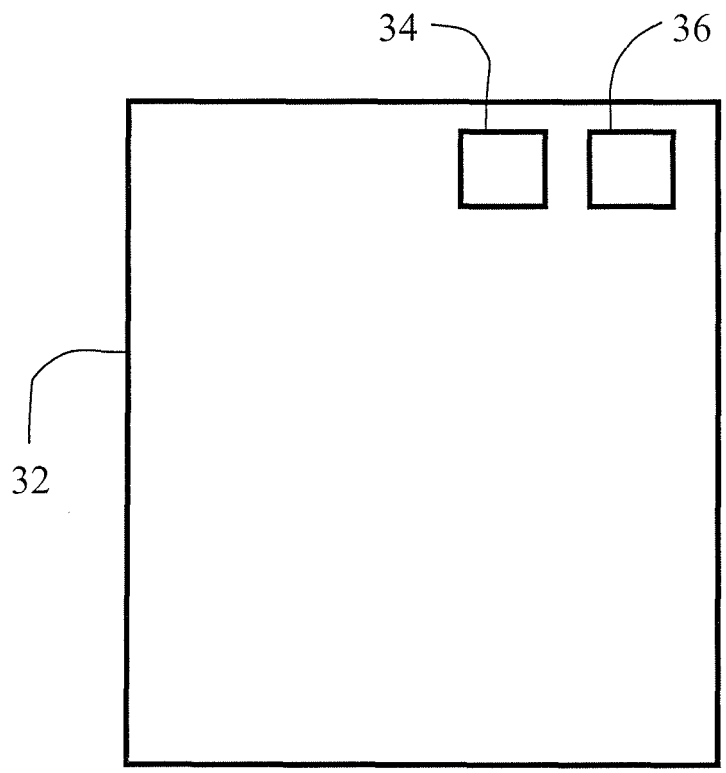
FIG. 5 is a front elevation view of a display.

Referring to FIG. 5, it is preferred that a display, generally indicated by reference numeral 32, be provided to indicate the values calculated by the device or to generate any alarm conditions, locally or remotely. A simple display 32 has been shown. In display 32, a normally-open dry-contact relay and two LED 34 and 36 are used for remote/local annunciation of pump status. When status is normal: the relay closed and LED 34 is illuminated green. When an alarm condition exists, the relay is open and LED 36 is illuminated red. It will be appreciated that two LED 34 and 36 are not necessary as a single multi-coloured LED could be used. It will also be apparent that a different form of display could be used.

Apparatus 10 will alarm upon any one of the following conditions:

Low flow condition: pump flow per stroke has dropped by ~25%; due to stroke-length change, faulty check-valves, loss of supply chemical, or other pump/piping failure High flow condition: pump flow per stroke has increased by ~25%; due to stroke-length change among other possible reasons High pressure condition: pump discharge pressure above the pre-set value; due to line blockage among other possible reasons Low pressure condition: pump discharge pressure below the pre-set value; due to leakage in piping downstream the discharge among other possible reasons.

Apparatus 10 can be used to manipulate other devices and exert a feedback control action. For example, it can turn off the pump in case of low pressure condition which is potentially due to leakage in the lines, and therefore prevent a large spill of potentially valuable or toxic chemical. The system is intelligent in the sense that it initially learns the current levels of flow-rate, flow per stroke, or other parameters and subsequently verifies them to remain within an acceptable range compared to the learned values.

As apparatus 10 monitors the volume pumped per stroke, it can distinguish situations where the flow-rate is intentionally changed by the operator, and hence avoid signalling false alarms. For example, it is a common practice to increase or decrease the pumped flow-rate remotely from a control room by increasing or decreasing stroke rate. While changing stroking frequency changes the pumped flowrate, the volume of fluid pumped per stroke remains almost unchanged. Apparatus 10 distinguishes this condition characterized by a relatively constant volume per stroke, and a change in stroke rate, and therefore can ignore it as an alarm state if required so. In situations where the flow per stroke does change by stroke rate, the false alarm can be avoided by triggering a re-calibration process whenever a change in stroke rate is detected.

Advantages:

Apparatus 10 is an intelligent injection-pump monitoring sensor. It verifies flow and pressure conditions at the pulsating pump discharge by continuously analysing pressure signals. Apparatus 10 alarms when flow or pressure conditions are out of range compared to the values learned upon power-up. Apparatus 10 provides the following features:

Real-time monitoring of flow rate (flow switch) and discharge pressure (pressure switch)

Measures volume pumped per stroke, allowing the pump stroking rate to be remotely controlled (air pulsed pumps or VFD) without causing false alarms Available for General Purpose or Division 1 & 2 hazardous locations CRN approved for high pressure applications (up to 15000 psig)

Wide range of operating temperatures (−43° C. up to 150° C.)
Auto self-learn, no calibration required
No moving parts
Low power consumption, ideal for solar or battery powered systems

EXAMPLES

A typical pressure versus time curve downstream of a pulsating pump is presented in FIG. 3. In the context of this representative curve, the following parameters can be interpreted:

Stroke period: is the time between two pressure minimums

Stroke rate: is the inverse of stroke period

Downstream base pressure: is the minimum pressure

Instantaneous Flowrate: is proportional to (pressure)−(base pressure) at any instant. This proportionality can be linear or non-linear. The proportionality factor is found by calibration or is estimated by the processor.

Flow per stroke: is the sum (integral) of instantaneous flowrate over the stroke period. Flow per stroke would be proportional to the area under the pressure peak and its base (indicated by the peak area on the figure) if instantaneous flowrate is linearly proportional to (pressure)−(base pressure)

Average flowrate per stroke: is the sum (integral) of instantaneous flowrate over stroke period divided by stroke period Average flowrate: average of average flowrate per stroke over a number of strokes Note that the pressure curve discussed here is an idealized representation, where pressure peaks are identical over time. This is not the case in practice; hence the parameters described above are estimated for each peak and averaged over time.

The plot shown in FIG. 4 shows how pressure peaks are intensified when a restricting element is introduced downstream of the pump and after the pressure transmitter. This enhances the contrast of the real signal from environmental noise, and results in more accurate parameter estimation.
Comparison with Willner et al The key difference is the method used to analyse the peaks. Considering a pump's discharge pressure versus time curve, our method isolates each peak and calculates the area surrounded by the peak and its base, i.e. integrating pressure or a mathematical function of it over time, which is a direct measure of the volume of fluid injected per stroke. Willner is using the differential of the spike, i.e. pressure change versus time, which may or may not depend on flow rate or volume per stroke, and is very much context dependent and difficult to interpret conclusively, if at all. This difference in algorithms makes the deliverables of our claim broader and limits the application of Willner's in the following ways:
Our apparatus and method mainly revolve around quantitative validation of volume of fluid injected by the pump, and essentially is a flow meter.
The main difference is that our method quantifies the amount of fluid injected per stroke (and the flowrate as well). For example we can detect if flowrate or volume per stroke is changed by 30%. And it is done independently from any knowledge about stroke length, stroke rate, etc. Willner is not claiming anything about quantifying the flowrate or flow per stroke. Willner's method only verifies "actual fluid delivery" by confirming the presence of spikes and the rate of pressure change during spikes—it does not and cannot quantify the flowrate, or volume per stroke.

Willner's method is affected by changes in stroke-rate or stoke-length. For example, if the stroke-rate is constant, longer strokes will inject more fluid and vice versa—our method detects this regardless, while it may be identical to Willner's method if injection is done into a constant pressure reservoir. Another example is if the stroke rate is constant, but strokes are performed more abruptly, the flowrate or volume per stroke remains constant our method can detect this scenario and notice the flowrate is constant, while Willner's method will only see a difference in slope and cause false alarm. Another example is that if the operator increases stroke-rate and decreases stroke-length, while maintaining a constant overall flowrate, our algorithm can understand the overall flowrate is constant and not alarm if required, but Wilner's will only detect a change and will alarm.
Other Differences:

We are detecting and announcing stroke-rate and stroke-length, parameters that are of interest for the user. In general, our device monitors a pump's operating parameters quantitatively.

Our high/low alarm is not limited just to the steady-state time between strokes, unlike Willner's, hence it alarms when the spike is above an undesirable value which can potentially damage the pump.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The scope of the claims should not be limited by the preferred embodiments set forth in the examples, but should be given a broad purposive interpretation consistent with the description as a whole.

What is claimed is:

1. A method for controlling the operation of a pulsating pump, the method comprising:
    monitoring discharge pressure patterns caused by each stroke of the pulsating pump;
    using a computer processing unit to analyze each pressure spike in the discharge pressure patterns and arrive at derived calculations for stroke length, stroke frequency, and flow rate, wherein a width of a base of the pressure spike is used to calculate the pump stroke frequency and an area of the pressure spike is used to calculate the fluid pumped per stroke, or equivalently the pump's stroke length, and the pump flowrate is calculated using the fluid pumped per stroke multiplied by the stroke frequency; and
    implementing a pump control strategy, using the computer processing unit, based upon a set of operating rules and the derived calculations.

2. The method of claim 1, wherein the processing unit compares the derived calculations to set values either calibrated or self-learned.

3. The method of claim 2, wherein the processing unit implements the pump control strategy based upon the set of operating rules and a comparison of the set values with the derived calculations.

4. The method of claim 2, wherein the processing unit triggers an alarm when the derived calculations differ from the set values.

5. The method of claim 4, wherein the processing unit has stored in memory a look up table of acceptable set values indicative of intentional operator implemented changes, for which an alarm need not be triggered notwithstanding that the derived calculations differ from the set values.

6. The method of claim 2, wherein the processing unit has stored in memory a diagnostic look up table and triggers a "pre-emptive service call required" alarm based upon a prediction of possible failure in future due to differences noted between the derived calculations and the set values.

7. The method of claim 1, wherein the discharge pressure patterns are monitored using a pressure sensor, and a flow restricting apparatus upstream of the pressure sensor is used to exaggerate discharge pressure patterns, thereby providing increased sensitivity and accuracy to pressure sensor measurement.

8. An apparatus for controlling the operation of a pulsating pump, the apparatus comprising:
a pressure sensor for monitoring discharge pressure patterns caused by each stroke of the pulsating pump;
a computer processing unit that analyzes each pressure spike in the discharge pressure patterns to arrive at derived calculations for stroke length, stroke frequency, flow per stroke, and flow rate, wherein a width of a base of the pressure spike is used to calculate the pump stroke frequency and an integral of the pressure spike or a mathematical function of it is used to calculate the flow per stroke or equivalently the pump's stroke length, and the pump flow rate is calculated using the fluid pumped per stroke multiplied by the stroke frequency; and
wherein the computer processing unit implements a pump control strategy based upon a set of operating rules and the derived calculations.

9. The apparatus of claim 8, in combination with a flow restricting apparatus located upstream of the pressure sensor.

10. The apparatus of claim 9, wherein the flow restricting apparatus is an orifice plate.

11. The apparatus of claim 8, wherein the processing unit is programmed to compare the derived calculations to set values either calibrated or self-learned.

12. The apparatus of claim 11, wherein the processing unit is programmed to implement the pump control strategy based upon the set of operating rules and a comparison of the set values with the derived calculations.

13. The apparatus of claim 11, further comprising an alarm, and wherein the processing unit is programmed to trigger an alarm when the derived calculations differ from the set values.

14. The apparatus of claim 13, wherein the processing unit has a look up table of acceptable set values, indicative of intentional operator implemented changes, stored in memory, for which an alarm need not be triggered notwithstanding that the derived calculations differ from the set values.

15. The apparatus of claim 11, wherein the processing unit has a diagnostic look up table stored in memory and triggers a "pre-emptive service call required" alarm based upon a prediction of possible future failure due to differences noted between the derived calculations and the set values.

* * * * *